United States Patent
Bux et al.

[11] Patent Number: 6,122,957
[45] Date of Patent: Sep. 26, 2000

[54] WHEEL-BALANCING METHOD AND DEVICE

[75] Inventors: Hermann Bux, Adelzhausen; Peter Ross, München; Stefan Schommer, Martinsried; Michael Worm, München, all of Germany

[73] Assignee: Beissbarth GmbH, Munich, Germany

[21] Appl. No.: 08/793,985

[22] PCT Filed: Sep. 7, 1995

[86] PCT No.: PCT/EP95/03517

§ 371 Date: Mar. 10, 1997

§ 102(e) Date: Mar. 10, 1997

[87] PCT Pub. No.: WO96/07880

PCT Pub. Date: Mar. 14, 1996

[30] Foreign Application Priority Data

Sep. 8, 1994 [DE] Germany .......................... 44 32 016

[51] Int. Cl.[7] .................................................. G01M 1/00
[52] U.S. Cl. ................................................. 73/66; 73/462
[58] Field of Search .............................. 73/468, 462, 66; 364/463, 550; 356/139.09, 152.1, 155

[56] References Cited

U.S. PATENT DOCUMENTS

| | | | |
|---|---|---|---|
| 4,489,607 | 12/1984 | Park | 73/462 |
| 4,958,290 | 9/1990 | Kendall et al. | 364/463 |
| 5,054,918 | 10/1991 | Downing et al. | 356/139.09 |
| 5,365,786 | 11/1994 | Douglas | 73/462 |
| 5,471,874 | 12/1995 | Rothamel et al. | 73/462 |

FOREIGN PATENT DOCUMENTS

| | | |
|---|---|---|
| 565320 | 10/1993 | European Pat. Off. . |
| 4101921 | 8/1991 | Germany . |
| 4229865 | 3/1994 | Germany . |

*Primary Examiner*—Richard A. Moller
*Attorney, Agent, or Firm*—Reed Smith Hazel & Thomas LLP

[57] ABSTRACT

The invention concerns a device for balancing a wheel comprising a rim and a tire. This device comprises a unit for measuring the wheel imbalance and a unit for scanning the rim dimensions. The scanner unit and the imbalance-measuring unit are connected to a computer which determines a rim contour from the scanner unit output signals and then the optimum positions and dimensions for the balance weights from the contour determined in conjunction with values supplied by the imbalance-measuring unit.

19 Claims, 3 Drawing Sheets

WHEEL-BALANCING METHOD AND DEVICE

BACKGROUND OF THE INVENTION

The invention concerns a method and a device for balancing a wheel.

In prior devices and methods for the balancing of automobile wheels, the nominal data of the wheel rim are computed as wheel specific data or are evaluated by means of a measuring device. A computer provided in the balancing device evaluates, thereafter, the positions and values of the balancing weights.

The nominal data, however, in many cases do not correspond to the positions in which the balancing weights may be mounted. Therefore, the balancing positions have to be evaluated through correction factors which, however, constitute only mean values for various rim types and sizes. By using such average values, differences originate between the calculated and the actual balancing positions which can lead to an insufficient result in balancing.

A method for compensating the lack of balance on a automobile wheel is known from the European patent application EPO 586 856 Al in which a pick-up device is provided in order to manually pick up or determine, respectively, the positions on the outline of the rim at which the balancing weights should be mounted according to the experience of the user. In doing so, the pick-up is brought to the so-called balancing planes where the balancing weights should be mounted later on. The deficiency of this known method is that the user decides during the picking-up in which areas the balancing weights should be arranged. Furthermore, the known method is only applicable with standardized wheel shapes (standard wheels, flat-base rims, steep shoulder wheels etc.) which may be characterized by means of a few pick-up values on the various balancing planes.

SUMMARY OF THE INVENTION

It is the object of the invention to evaluate the optimal balancing values, as weight and positions for the balancing weights for any wheel forms without a user having to determine the balancing planes beforehand.

This object is met by a method for balancing a wheel by means of balancing weights, wherein the dimensions of the wheel rim are scanned and the scanning values are fed to a computer which evaluates the outline of the wheel from such scanning values, and wherein the optimal balancing values are determined from the evaluated outline in connection with a measurement of the level or degree to which the wheel is unbalanced.

In a preferred embodiment of the method according to the invention, the evaluated outline as well as the optimal balancing values as determined by the computer, in particular positions and values of the balancing weights, are graphically displayed on a display device at the corresponding positions of the outline.

In a further preferred embodiment of the method according to the invention, the balancing positions shown on the outline may be manually moved by a user through an input console, and these movements are taken into account as boundary conditions in calculating the balancing values by the computer.

In a further preferred embodiment of the method according to the invention, the scanning of the wheel comprises a picture detection in which pictures are converted into electrical signals, such that visible portion of the rim is displayed as a picture in the picture scanning unit. The resulting scanned picture is fed to the computer which evaluates the outline from the picture of the visible part of the rim.

In a further preferred embodiment of the method according to the invention, the scanning of the wheel is effected by measuring the distance between a distance meter and addressed points on the outline of the wheel rim.

The above object is furthermore met by a device for balancing a wheel by means of balancing weights comprising an unbalance measuring unit for measuring the degree to which the wheel is unbalanced, a scanning device for scanning the wheel rim, and a computer being connected to the scanning device and the unbalance measuring device, wherein the scanning device is adapted to detect the outline of the wheel rim, and wherein the computer is constructed such that the outline of the wheel may be evaluated from the output signals of the scanning device, and the optimal balancing values for the balancing weights may be determined from the evaluated outline in connection with the measuring values of the unbalance measuring device.

In a preferred embodiment of the device according to the invention, a display device is provided which is connected to the computer and displays the evaluated outline as well as the optimal balancing values at the corresponding positions of the outline graphically as determined by the computer.

In a further preferred embodiment of the device according to the invention, the scanning device comprises a pick-up which is guided manually across the wheel rim, and detectors are provided for detecting the special movement of the pick-up, the output signals of the detectors being received by the computer.

In another preferred embodiment of the device according to the invention, the scanning device comprises a pick-up which is movable by motor drives, In another preferred embodiment of the device according to the invention, the scanning device comprises a pick-up having a distance meter which measures the distance between the pick-up and an addressed point of the outline of the wheel rim.

In another preferred embodiment of the device according to the invention, the distance meter is pivotally arranged, and detectors are provided for detecting the pivotal movement of the distance meter, the output signals of the detectors being received by the computer.

In an even further preferred embodiment of the device according to the invention, the computer comprises a control unit for controlling the movement of the pick-up.

In another preferred embodiment of the device according to the invention, the scanning device comprises a picture detecting unit.

In another preferred embodiment of the device according to the invention, the picture detecting unit comprises a camera which detects the inner outline of the wheel, wherein the output signals of the camera are usable by the computer for evaluating the outline.

Since the outline of the wheel is always known to the computer in all details by means of the scanned values, special situations can also be taken into account. For example, with adhesive weights, the computer may advantageously take into account the following criteria in optimizing the positions for the balancing weights: The distance between the inner and outer balancing weights should be as large as possible in order to minimize the value of the weights and to put up the quality of the balancing in connection with the material usage, the accuracy of the balancing and the optical impression. Furthermore, it should be possible to mount the weights by avoiding edges, corners, ribs, detents and the like.

In the case of driven-in weights, the computer may advantageously analyse the rim flange belonging to the outline of the rim and may determine, therefrom, the exact position for the driven-in weights.

Advantageously, a display device is connected to the computer on which the evaluated outline, as well as also the optimal positions of the balancing weights at the corresponding locations of the outline as determined by the computer, are displayed in a graphical manner. By means of this display, the optimal positions for mounting the balancing weights at the wheel may again be found. In case the optimal positions as evaluated by the computer do not correspond to the desire of the user anyhow, e.g. in respect to the aesthetic impression, the balancing positions displayed at the outline may advantageously be moved by hand by the user through an input console. Thereafter, the computer again computes the required balancing values taking into account such boundary conditions.

The scanning is made advantageously automatically by means of a guided pick-up, e.g. a pick-up moved by a motor. However, even in a simple embodiment of the invention where the manual guiding of a pick-up is provided, the pick-up may be moved "blind" along the rim by a user In any case, it is not necessary to bend down when looking into the wheel for determining the balancing planes.

BRIEF DESCRIPTION OF THE DRAWINGS

In the following, the invention is described by means of preferred embodiments with reference to the attached drawings, in which.

DETAILED DESCRIPTION OF THE PREFERRED EMBODIMENTS

Figure 1:
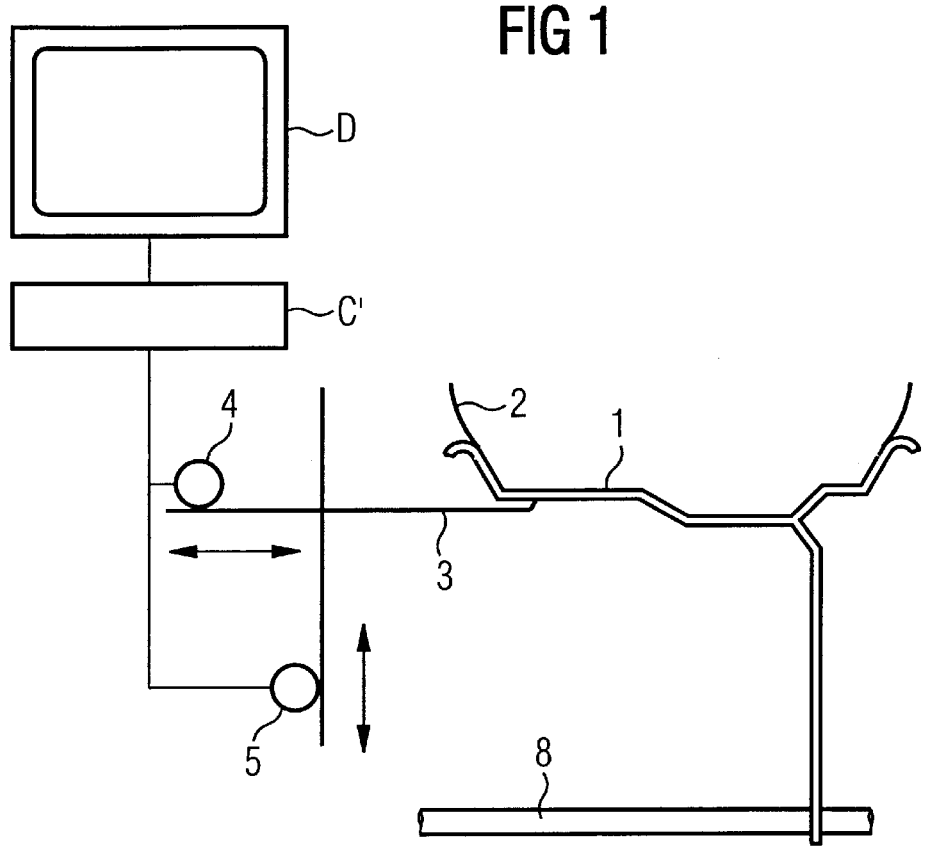
FIG. 1 shows a first embodiment of a device according to the invention.

A rim 1 is shown in cross section in FIG. 1 on which a tire 2 is mounted. The rim 1 with the tire 2 is rotatably mounted on a shaft 8. A pick-up device comprises a pick-up 3 which may by moved by means of a drive 4 in the horizontal direction (i.e. in parallel to the shaft 8) and by means of a drive 5 in the vertical direction (i.e. perpendicular to the shaft). The pick-up device 3 is connected to a computer (not shown).

In operation, the pick-up 3 is moved along the inner outline 15 of the rim 1 by means of the two motor drives 4 and 5, wherein the horizontal and vertical positions of the pick-up are detected either through the drives (e.g. stepping motors) themselves or by appropriate sensors (not shown). The output signals of the pick-up device are transferred to the computer which evaluates the inner outline of the rim in all points from the complete set of the signals. In a simple embodiment, wherein the drives 4 and 5 are omitted, the pick-up is guided manually and along the outline of the rim, and the horizontal and vertical positions of the pick-up are detected by sensors.

Figure 2:
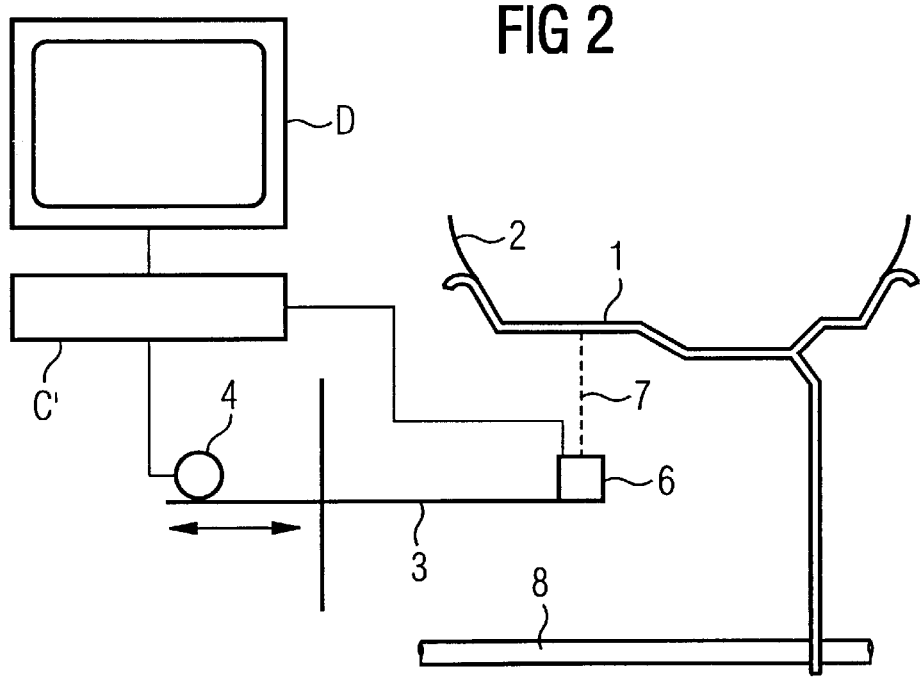
FIG. 2 shows a second embodiment of the invention.

A second embodiment is shown in FIG. 2 which differs from the preceding embodiment in that the pick-up device comprises a distance meter 6 which is manually movable or by means of the drive 4 in the horizontal direction, the distance between the distance meter 6 and the respective point addressed at the outline of the rim being detected. The computer then evaluates from this measurement the complete outline of the rim of the wheel and takes this into account when calculating the balancing values.

Figure 3:
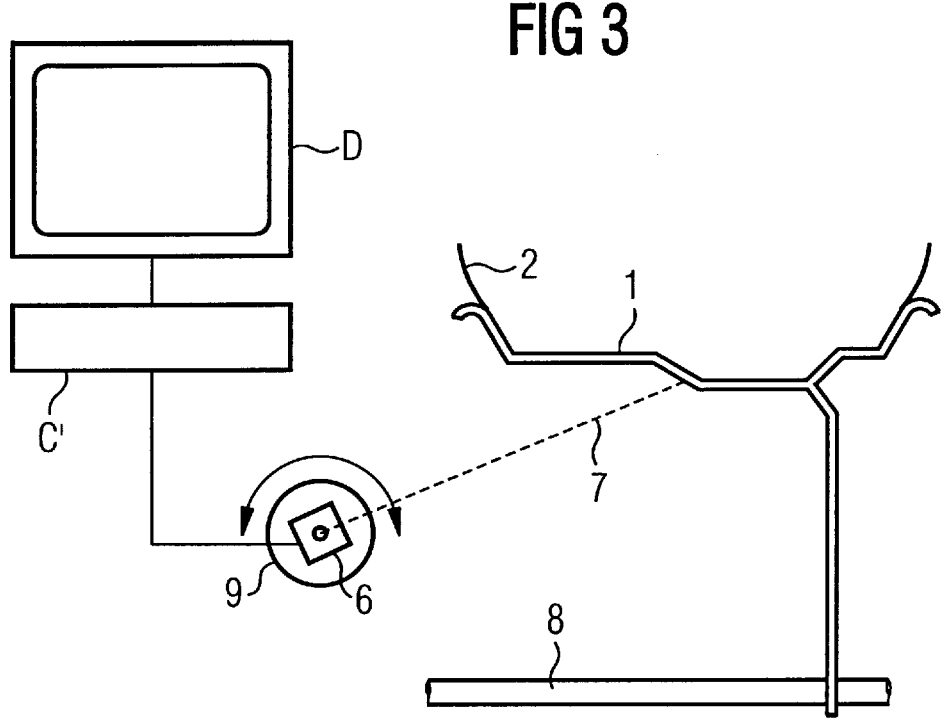
FIG. 3 shows a third embodiment of the invention.

In the embodiment of FIG. 3, the distance meter 6 is pivotally mounted wherein the movements in the horizontal and vertical directions are replaced by a pivoting movement by means of an appropriate pivoting drive 9. Also in this case, the distance between the distance meter 6 and the respective point addressed at the outline of the rim is detected, and the computer then evaluates from this measurement the complete outline of the rim of the wheel and takes this into account in the calculation of the balancing values.

The distance meter 6 for measuring the distance to the respective point addressed at the outline of the rim may be a mechanical, optical, ultrasonic or electrical (inductive or capacitive) distance meter.

Figure 4:
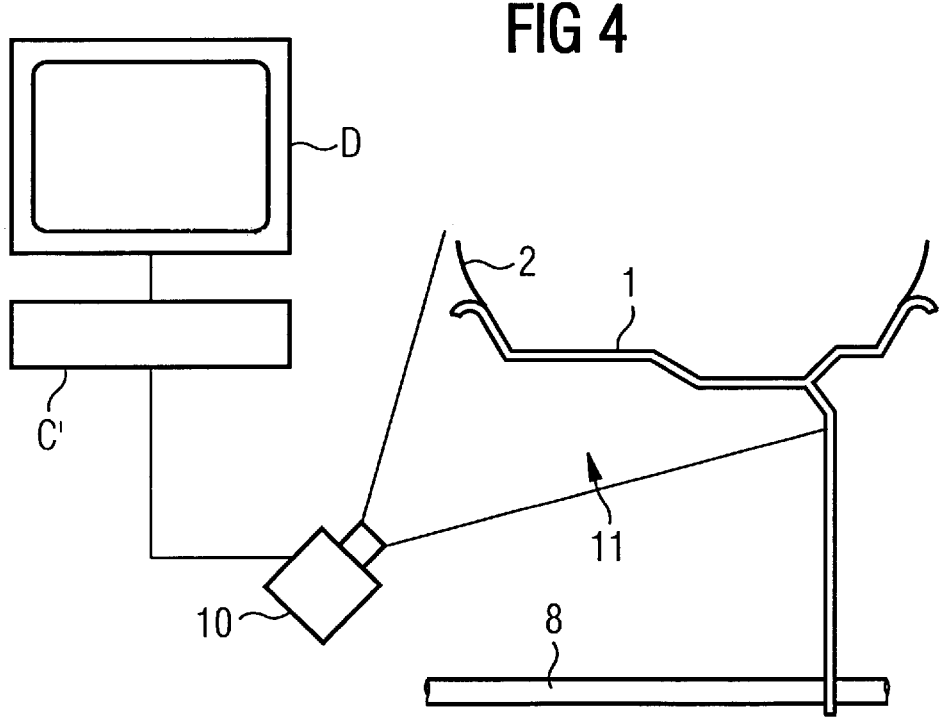
FIG. 4 shows a fourth embodiment of the invention.

In FIG. 4, instead of the distance meter 6, a camera 10 is provided whose picture scanning area 11 is chosen such that the inner outline of the rim may by scanned completely. The camera should, therefore, not be moved back and forth or pivoted. The camera converts the received picture into electrical signals which are processed in the connected computer in such a way that the outline is evaluated from the picture of the scanned portion of the rim.

Figure 5:
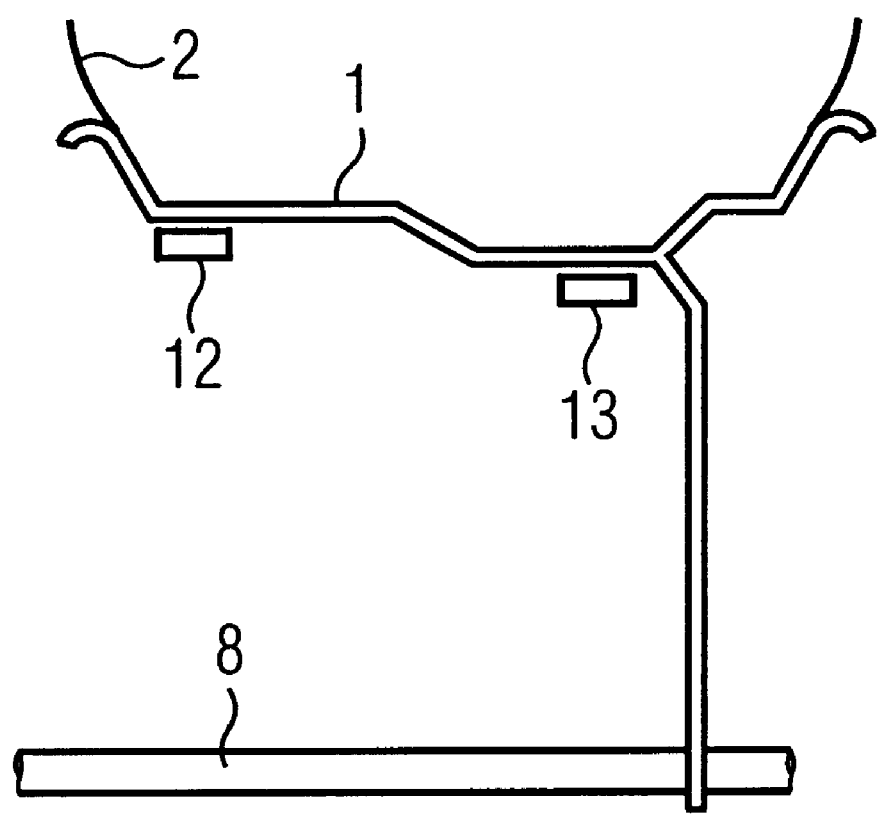
FIG. 5 shows an example of an optimal positioning of the balancing weights according to the invention.

An example for the mounting of hidden adhesive weights is shown in FIG. 5, the optimal positions 12 and 13 of which weights having been determined according to the invention.

In all embodiments a display device (not shown) may be provided which is connected to the computer and graphically shows the evaluated outline as well as the optimal balancing values at the corresponding positions of the outline as determined by the computer such that, by means of the display, the optimal positions for mounting the balancing weights at the rim of the wheel may be found.

What is claimed is:

1. A method for balancing a wheel by means of balancing weights, comprising the steps of:

measuring a degree the wheel is unbalanced;

scanning the dimensions of the wheel rim and computing the outline of the wheel rim from said scanning values;

determining optimal balancing positions of the balancing weights on the wheel rim from the computed outline of the wheel rim; and computing the values of the balancing weights for balancing the wheel on the basis of said optimal balancing positions and the degree the wheel is unbalanced.

2. The method according to claim 1, further comprising the steps of graphically displaying the computed outline of the wheel rim, the computed optimal balancing positions of the balancing weights on the wheel in conjunction with the rim, and values of the balancing weights at said optimal balancing positions of the outline of the wheel rim.

3. The method according to claim 2, wherein said step of computing the optimal balancing positions includes variably selecting balancing positions relative to the outline of the wheel rim on the display, and calculating the values of the balancing weights based on using the selected balancing positions and the degree the wheel is unbalanced.

4. The method according to claim 1, wherein the step of scanning the wheel rim comprises scanning a visible portion of the rim and computing the outline from the picture of the visible portion of the rim.

5. The method according to claim 1, wherein the step of scanning the wheel rim includes measuring a distance between a distance meter and addressed points on the outline of the wheel rim.

6. A device for balancing a wheel by means of balancing weights comprising:
   an unbalance measuring unit for measuring the degree that the wheel is unbalanced;
   a scanning device for scanning the wheel rim, and
   a computer being connected to the scanning device and the unbalance measuring device, wherein the scanning device includes means for detecting an outline of the wheel rim, and the computer includes
      means for evaluating the outline of the wheel from the output signals of the scanning device,
      means for determining optimal balancing positions of the balancing weights on the wheel rim; and
      means for computing the values of the balancing weights for balancing the wheel on the basis of said optimal balancing positions and the degree the wheel is unbalanced.

7. The device according to claim 6, further comprising a display device connected to the computer for displaying the evaluated outline of the wheel rim, the computed optimal balancing positions of the balancing weights on the wheel rim and the values of the balancing weights at said optimal balancing positions of the outline of the wheel rim.

8. The device according to claim 6, wherein the scanning device includes a pick-up which is guided manually across the wheel rim, and detectors for detecting the movement of the pick-up, the output signals of the detectors being received by the computer.

9. The device according to claim 6, wherein the scanning device comprises a pick-up which is movable by motor drives.

10. The device according to claim 8, wherein the scanning device comprises a pick-up having a distance meter which measures the distance between said pick-up and an addressed point of the outline of the wheel rim.

11. The device according to claim 10, wherein the distance meter is pivotally arranged, and detectors are provided for detecting the pivotal movement of the distance meter, the output signals of the detectors being received by the computer.

12. The device according to claim 9, wherein the scanning device comprises a pick-up having a distance meter which measures the distance between the pick-up and an addressed point of the outline of the wheel rim.

13. The device according to claim 12, wherein the distance meter is pivotally arranged, and detectors are provided for detecting the pivotal movement of the distance meter, the output signals of the detectors being received by the computer.

14. The device according to claim 9, wherein the computer includes means for controlling the movement of the pick-up.

15. The device according to claim 6, wherein the scanning device includes a picture detecting unit.

16. The device according to claim 15, wherein the picture detecting unit includes a camera which detects the inner outline of the wheel, the output of the signals are outputted to the computer for evaluating the outline.

17. A device for balancing a wheel by means of balancing weights comprising:
   an unbalance measuring unit for measuring the degree that the wheel is unbalanced;
   a scanning device for scanning the wheel rim, and
   a computer being connected to the scanning device and the unbalance measuring device, wherein the scanning device includes a pick-up which is guided manually across the wheel rim, and detectors for detecting the movement of the pick-up, the output signals of the detectors being received by the computer, and the computer includes
      means for determining optimal balancing positions of the balancing weights on the wheel rim; and
      means for computing the values of the balancing weights for balancing the wheel on the basis of said optimal balancing positions and the degree the wheel is unbalanced.

18. A device for balancing a wheel by means of balancing weights comprising:
   an unbalance measuring unit for measuring the degree that the wheel is unbalanced;
   a scanning device for scanning the wheel rim, and
   a computer being connected to the scanning device and the unbalance measuring device, wherein the scanning device includes a pick-up which is movable by motor drives, and the computer includes
      means for evaluating the outline of the wheel from the output signals of the scanning device,
      means for determining optimal balancing positions of the balancing weights on the wheel rim; and
      means for computing the values of the balancing weights for balancing the wheel on the basis of said optimal balancing positions and the decree the wheel is unbalanced.

19. A device for balancing a wheel by means of balancing weights comprising:
   an unbalance measuring unit for measuring the degree that the wheel is unbalanced;
   a scanning device for scanning the wheel rim, and
   a computer being connected to the scanning device and the unbalance measuring device, wherein the scanning device includes a picture detecting unit, and the computer includes
      means for evaluating the outline of the wheel from the output signals of the scanning device,
      means for determining optimal balancing positions of the balancing weights on the wheel rim; and
      means for computing the values of the balancing weights for balancing the wheel on the basis of said optimal balancing positions and the degree the wheel is unbalanced.

* * * * *